US012690506B2

(12) United States Patent (10) Patent No.: US 12,690,506 B2
De Vree et al. (45) Date of Patent: Jul. 28, 2026

(54) BALE PICKUP DEVICE FOR PICKING UP OF ROUND BALES OF A ROUND BALER

(71) Applicant: Maschinenfabrik Bernard Krone GmbH & Co. KG, Spelle (DE)

(72) Inventors: Gerwin De Vree, CV Emmer-compascuum (NL); Nils Bruhn, Spelle (DE)

(73) Assignee: Maschinenfabrik Bernard Krone GmbH & Co. KG, Spelle (DE)

( * ) Notice: Subject to any disclaimer, the term of this patent is extended or adjusted under 35 U.S.C. 154(b) by 426 days.

(21) Appl. No.: 18/340,634

(22) Filed: Jun. 23, 2023

(65) Prior Publication Data

US 2023/0413707 A1    Dec. 28, 2023

(30) Foreign Application Priority Data

Jun. 24, 2022    (DE) .......................... 102022115781.4

(51) Int. Cl.
  *A01B 59/04*        (2006.01)
  *A01D 90/08*        (2006.01)
  *A01F 15/07*        (2006.01)
(52) U.S. Cl.
  CPC ............ *A01B 59/04* (2013.01); *A01D 90/083* (2013.01); *A01F 15/07* (2013.01)
(58) Field of Classification Search
  CPC ............................... A01D 90/083; A01D 90/08
  See application file for complete search history.

(56) References Cited

U.S. PATENT DOCUMENTS

| | | | | |
|---|---|---|---|---|
| 3,480,163 | A | * | 11/1969 | Mcadams ............ A01D 87/125 414/335 |
| 4,815,266 | A | * | 3/1989 | Ratzlaff ............... A01D 90/083 100/88 |
| 6,607,342 | B1 | * | 8/2003 | Tolzin .................... A01D 90/08 414/24.5 |
| 2005/0188862 | A1 | | 9/2005 | Hoover et al. |
| 2020/0247196 | A1 | * | 8/2020 | Guiet .................... B60K 25/00 |

FOREIGN PATENT DOCUMENTS

| | | |
|---|---|---|
| CA | 2165111 A1 | 6/1997 |
| DE | 3304166 C2 | 5/1986 |
| EP | 0404668 A1 | 12/1990 |

* cited by examiner

*Primary Examiner* — Cathleen R Hutchins
(74) *Attorney, Agent, or Firm* — McKee, Voorhees & Sease, PLC

(57)        ABSTRACT

A bale pickup device for picking up of at least one round bale from a round baler is disclosed that can also include a vehicle and a rounder baler. This includes a coupling device with at least one coupling frame element on a machine frame of the round baler and at least one drawbar element extending in a pickup direction at least partially between the coupling frame element and a machine frame of the bale pickup device and mounted on the coupling device that it is pivotably movable relative to the coupling frame element, wherein a transfer element mounted on the coupling device and pivotably movable relative to the drawbar element at least about the vertical axis and extending in the pickup direction in such a way that the drawbar element is arranged at least partially between the transfer element and the contact surface in a side view.

14 Claims, 5 Drawing Sheets

BALE PICKUP DEVICE FOR PICKING UP OF ROUND BALES OF A ROUND BALER

CROSS REFERENCE TO RELATED APPLICATIONS

This application claims priority under 35 U.S.C. § 119 to German Patent Application DE 10 2022 115 781.4, filed Jun. 24, 2022, which is herein incorporated by reference in its entirety, including without limitation, the specification, claims, and abstract, as well as any figures, tables, appendices, or drawings thereof.

FIELD OF THE INVENTION

The present invention is to provide a generic bale pickup device and a vehicle combination comprising the bale pickup device.

BACKGROUND OF THE INVENTION

The background description provided herein gives context for the present disclosure. Work of the presently named inventors and aspects of the description that may not otherwise qualify as prior art at the time of filing are neither expressly nor impliedly admitted as prior art.

Such a bale pickup device has become known as a bale wrapper which is to be attached to the round baler and is configured for wrapping the round bale with a sheathing material. The known bale pickup device is disadvantageous, on the one hand, inasmuch as the coupling device and the drawbar element only allow limited pivoting of the round baler relative to the bale pickup device, which limits the curve radius that can be achieved in operation and regularly leads to collisions between the coupling device and the bale pickup device. On the other hand, the bale pickup device is disadvantageous inasmuch as the coupling device and the drawbar element, to enable the slight pivoting, are themselves configured to taper in such a way towards the vertical axis that there is a gaping intermediate space to the side of the vertical axis, between the coupling device and the drawbar element, into which the round bale may fall laterally during its pickup from the round baler, before it has reached the machine frame of the bale pickup device.

Therefore, there is a strong need to have a baler that has a continuous intake of harvested material.

SUMMARY OF THE INVENTION

The following objects, features, advantages, aspects, and/or embodiments are not exhaustive and do not limit the overall disclosure. No single embodiment needs to provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

The invention relates to a bale pickup device for picking up of at least one round bale from a round baler. The invention further relates to a vehicle combination comprising the bale pickup device. The bale pickup device comprises a coupling device having at least one coupling frame element that is configured to be fixedly arranged on a machine frame of the round baler. Further, the bale pickup device comprises at least one drawbar element, which extends at least partially in a pickup direction between the coupling frame element and a machine frame of the bale device. The drawbar element is mounted on the coupling device in such a way that it is pivotably movable relative to the coupling frame element, at least about a vertical axis, which at least in a first position of the coupling device, is arranged at a right angle to a contact surface of the bale pickup device.

According to the invention, the bale pickup device comprises a transfer element. The transfer element is mounted on the coupling device and is pivotably movable relative to the drawbar element, at least about the vertical axis. The transfer element extends in the pickup direction in such a way that the drawbar element is arranged at least partially between the transfer element and the contact surface in a side view or in a longitudinal section.

The bale pickup device is, in particular, a vehicle to be coupled to the round baler, comprising its own undercarriage. The bale pickup device preferably forms a pickup segment for the round bales adjoining the round baler, in particular, a pressing chamber of the round baler. Due to the standardized round bale dimensions, the pickup segment preferably has a width of at least 1.20 m and a height of at least 1.20 meters. The bale pickup device is preferably configured for pickup and transport of a plurality of, in particular, at least four round bales. The bale pickup device is configured in such a way that the round bales are preferably not displaced laterally from their position in the pressing chamber during pickup (in-line pickup).

In particular, the coupling frame element is to be fastened in a non-movable manner, preferably bolted, to the machine frame of the round baler. The bale pickup device preferably comprises two coupling frame elements which are offset relative to each other in a transverse direction to the pickup direction. The at least one coupling frame element is, in particular, a lower link hook which has proven itself in agriculture for hitching up work machinery.

In a front view of the bale pickup device, the imaginary vertical axis is preferably arranged centrally, which is to say, within a longitudinal central plane. The longitudinal central plane is spanned by the vertical axis and a longitudinal axis running in a direction in which the bale pickup device is to be moved across the farmland during operation. The coupling device is, in particular, configured mirror-symmetrical to the longitudinal central plane. The pickup direction is preferably oriented at a right angle to the vertical axis and/or at least partially in a direction contrary to the direction of travel. The contact surface is an imaginary, flat surface which adjoins the undercarriage, preferably the wheels, of the bale pickup device without however intersecting it and extends in the direction of travel and/or corresponds to the ground surface of the farmland, provided it is flat. The vertical axis then extends vertically when the contact surface extends horizontally, and the coupling device is arranged in the first position. In a certain position of the coupling device or of the drawbar element, the vertical axis preferably extends at an angle of <90° to the contact surface.

The drawbar element connects the coupling device to the machine frame of the bale pickup device. The machine frame is preferably configured rigid with respect to an undercarriage axle of the bale pickup device and/or preferably comprises at least two lateral longitudinal members. Preferably, the drawbar element is not pivotably movable, relative to the machine frame, about a pivot axis angled relative to the contact surface. Preferably, the drawbar element comprises a central beam that is subject to tension and that extends in a direction contrary to the pickup direction, from the machine frame to the coupling device. The drawbar element is preferably pivotably movable by about 140° about the vertical axis relative to the coupling frame element.

The transfer element is arranged in such a way that, during operation, at least a part of it is arranged above at least a part of the drawbar element. The transfer element preferably extends from the coupling device in the pickup direction beyond the vertical axis. The transfer element is, in particular, mounted in such a way that, relative to the coupling frame element, it is not pivotably movable about an axis angled to the contact surface, such as, for example, the vertical axis. As a consequence, during operation, the transfer element does not follow a pivoting of the machine frame of the bale pickup device relative to the round baler. In side view or alternatively in longitudinal section, the transfer element preferably extends mainly in an elongate manner and relatively flat in the pickup direction and/or parallel to the main extension direction of the drawbar element.

The task is therefore solved by the transfer element in that, on the one hand, the coupling device and/or the drawbar element can be configured to be so narrow or alternatively tapered towards the vertical axis that a sufficient pivoting of the drawbar element relative to the coupling device during agricultural operation is enabled. On the other hand, the falling of a round bale into the intermediate space is prevented by the transfer element spanning the intermediate space. The transfer element is, in particular, configured in such a way that a collision with it during the pivoting is excluded.

The transfer element is, preferably, mounted on the coupling device in such a way that it is pivotably movable about a transverse axis parallel to the contact surface relative to the coupling frame element. The imaginary transverse axis is, in particular, positioned fixedly relative to the coupling frame element. In the event of a change of the upward inclination and/or of the downward inclination of the farmland on which the bale pickup device is operated, due to the pivotably movable mounting of the transfer element in this way, it is possible to adjust the position of the bale pickup device in favor of a reliable pickup of the round bale. The vertical axis and the transverse axis are preferably arranged in such a way that they do not intersect, which is to say, that they are spaced apart from each other. The vertical axis is, in particular, arranged offset in the pickup direction relative to the transverse axis.

The drawbar element is preferably mounted on the coupling device in such a way that it is pivotably movable relative to the coupling frame element, about an axis parallel to the contact surface. The drawbar element is, particularly preferably, mounted in such a way that it is pivotably movable relative to the coupling frame element, just like the transfer element, about the transverse axis. In this way, apart from a pivoting about the vertical axis, a relative movement of the transfer element and the drawbar element in the event of a change in of the upward inclination or alternatively of the downward inclination is avoided and the best possible configuration for pickup of the round bale can be maintained.

Preferably, the transfer element is mounted on the coupling device in such a way that it is pivotably movable about the transverse axis relative to the drawbar element. In this way, the transfer element and the drawbar element are not only pivotably movable relative to the coupling frame element, but rather also relative to each other about the transverse axis. This reduces the risk of a blockage of the pivoting movement of the drawbar element relative to the transfer element about the vertical axis, and the transfer element can thereby move upward out of the way. Alternatively, the transfer element and the drawbar element are not pivotably movable relative to each other about the transverse axis, whereby the probability of failure can be reduced because of an articulation that can be dispensed with elsewhere.

The coupling device preferably comprises an intermediate coupling element that is mounted on the coupling frame element so as to be exclusively pivotably movable about the transverse axis and is mounted on the drawbar element so as to be exclusively pivotably movable about the vertical axis. The intermediate coupling element allows the pivot movements described above to be implemented by two separate articulations, with each articulation allowing only one pivot direction and having a lower probability of failure than that of a complex articulation. Moreover, a part of the coupling device, together with the intermediate coupling element, can already contribute to the pickup of the round bale. For further simplification of the construction, the transfer element is preferably mounted on the intermediate coupling element spaced apart from the coupling frame element.

The transfer element preferably comprises a radial extension relative to the transverse axis, which extension, at least in a straight-ahead position of the bale pickup device, corresponds to at least half, preferably two-thirds, particularly preferably three-quarters or more, of the clearance of the machine frame of the bale pickup device from the transverse axis. Preferably, the transfer element is configured in such a way that its radial extension is variable. In particular, at least one end of the transfer element facing the machine frame of the bale pickup device is formed by an adjustable extension element. In the straight-ahead position of the bale pickup device, the drawbar element, relative to the coupling device, is not pivoted laterally about the vertical axis, and the coupling device is arranged in particular in the first position. The bale pickup device positions itself in the straight-ahead position during operation when the bale pickup device is moved straight ahead, which is to say, without a change of direction, on the farmland. Due to the radial extension of the transfer element, it reaches close to the machine frame of the bale pickup device and has a length that is at least similar to the length of the drawbar element. This minimizes the risk of the round bale falling between the machine frame and the transfer element.

Preferably, the clearance of the vertical axis from the machine frame of the bale pickup device is at least as large as the clearance of the vertical axis from the transverse axis. Particularly preferably, the clearance of the vertical axis from the machine frame is at least twice as large or even at least five times as large as the clearance of the vertical axis from the transverse axis. Because of this, the vertical axis is to be arranged particularly far forward, in particular below the pressing chamber of the round baler, which results in several advantages. On the one hand, this reduces the pivoting angle of the drawbar element, relative to the coupling device, about the vertical axis with comparable changes of directions and achieves more stable driving dynamics of the bale pickup device. On the other hand, this arrangement of the vertical axis allows the round bale to be picked up even in the case of at least slight changes of direction or alternatively pivoting angles about the vertical axis.

Preferably, the bale pickup device comprises at least one drawbar adjustment element. The drawbar adjustment element is configured for a pivoting of the drawbar element relative to the machine frame of the bale pickup device about a drawbar pivot axis, which is arranged parallel to the transverse axis in the straight-ahead position of the bale pickup device. The drawbar adjustment element is, in particular, a hydraulic cylinder. Preferably, the bale pickup device comprises two drawbar adjustment elements arranged on two opposite sides of the machine frame. The drawbar element and the machine frame can be lowered in a V-shape by means of the drawbar adjustment element, at least to a large extent and in particular down to the contact surface, whereupon the pickup direction is directed downward. In the lowered state, the round bale reaches the machine frame of the bale pickup device in a simplified manner due to the force of gravity. Alternatively, the drawbar element is rigidly mounted on the machine frame.

Preferably, the transfer element comprises a support segment for supporting the transfer element on the drawbar element. In particular, during operation, the transfer element rests together with the support segment on the drawbar element. For this purpose, the support segment, in particular, comprises a surface facing the contact surface. The transfer element is thus preferably mounted in the front region on the coupling device, in particular on the intermediate coupling element, and in the rear region on the drawbar element. This mounting is advantageous regardless of whether the transfer element is pivotably movable relative to the drawbar element about the transverse axis. The support segment is advantageous insofar as the weight force of a round bale resting on the transfer element above the drawbar element does not need to be dissipated solely by means of the coupling device and insofar as the transfer element needs to be of correspondingly solid design, but rather needs to be dissipated directly onto the drawbar element and, in particular, therefore at least in part onto the undercarriage of the bale pickup device.

The support segment and/or its described surface particularly preferably extend/extends at least substantially or exactly in a circular arc shape about the vertical axis. In particular, the support segment is formed by a tube with a cross-section symmetrical to a centerline, wherein the centerline extends in a circular arc shape about the vertical axis. The support segment preferably extends by at least 90°, in particular by at least the maximum pivot angle of the drawbar element relative to the coupling frame element about the vertical axis.

In an advantageous embodiment of the invention, a ball bearing or a slide bearing (in particular made of plastic), is arranged between the drawbar element and the transfer element. The slide bearing is configured, in particular, as a friction-reducing plastic element, for example, a plastic plate, arranged between the drawbar element and the transfer element, preferably on the drawbar element. The ball bearing or an alternative roller or barrel bearing is particularly advantageous if the transfer element is not pivotably movable about the transverse axis relative to the drawbar element. The advantageous power transmission is achieved by the ball bearing or the slide bearing without thereby causing wear that could endanger the reliability of the two pickup devices.

Preferably, the transfer element comprises at least two transfer segments extending longitudinally in the pickup direction, between which the drawbar element extends at least partially in a plan view, at least when in the straight-ahead position. The drawbar element extends, in particular, longitudinally in the longitudinal central plane. The transfer segments extend longitudinally offset from and parallel to the longitudinal central plane and are, in particular, mirror-symmetrical with respect to the longitudinal central plane.

The transfer segments permit a smooth rolling of the round bale in the pickup direction. The transfer element is, in particular, made in one piece and/or rigidly formed. For this purpose, the transfer segments are preferably welded to the support segment and, in particular, to a cross member of the transfer element extending parallel to the transverse axis.

The task is moreover solved by a vehicle combination comprising the round baler described above and/or below and the bale pickup device described above and/or below, which is coupled to the round baler.

The at least one coupling frame element is fixedly arranged on a machine frame of the round baler. The round baler is preferably a self-propelled round baler or a round baler attached to a tractor unit during operation. In the case of the vehicle combination, the coupling frame element is to be considered as included in the machine frame of the round baler. In particular, in this case, the transfer element and the drawbar element do not need to be supported on the same component of the machine frame of the round baler.

Preferably, the at least one coupling frame element is arranged on an undercarriage axle encompassed by the machine frame of the round baler. The undercarriage axle is a rigid component, upon which are mounted laterally, in particular, wheels, and which undercarriage axle extends horizontally below the pressing chamber. Through the arrangement of the at least one coupling frame element on the undercarriage axle, the vertical axis can, in practice, be arranged particularly far forward in order to achieve the advantages described above. The transverse axis is, in particular, arranged behind the undercarriage axle, which is to say, offset in the pickup direction relative to the undercarriage axle. In this way, reliable guidance of the round bale to the machine frame of the bale pickup device can be achieved.

It is expressly pointed out that the above-described embodiments of the invention can be combined in each case individually, but also in any combinations with one another, with the subject matter of the main claim, provided that no technically compelling obstacles are in conflict therewith.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

Further modifications and embodiments of the invention can be derived from the following description of the subject matter and the drawings.

The invention is now to be explained in more detail with reference to exemplary embodiments.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated. Further details and advantages of the invention can be found in the schematic figures described below.

In the drawings.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated. The hereinafter elucidated features may also be an aspect of the invention individually or in combinations other than those shown or described, but always at least in combination with the features of the claims. Where appropriate, functionally equivalent parts are provided with identical reference numbers.

Figure 1:
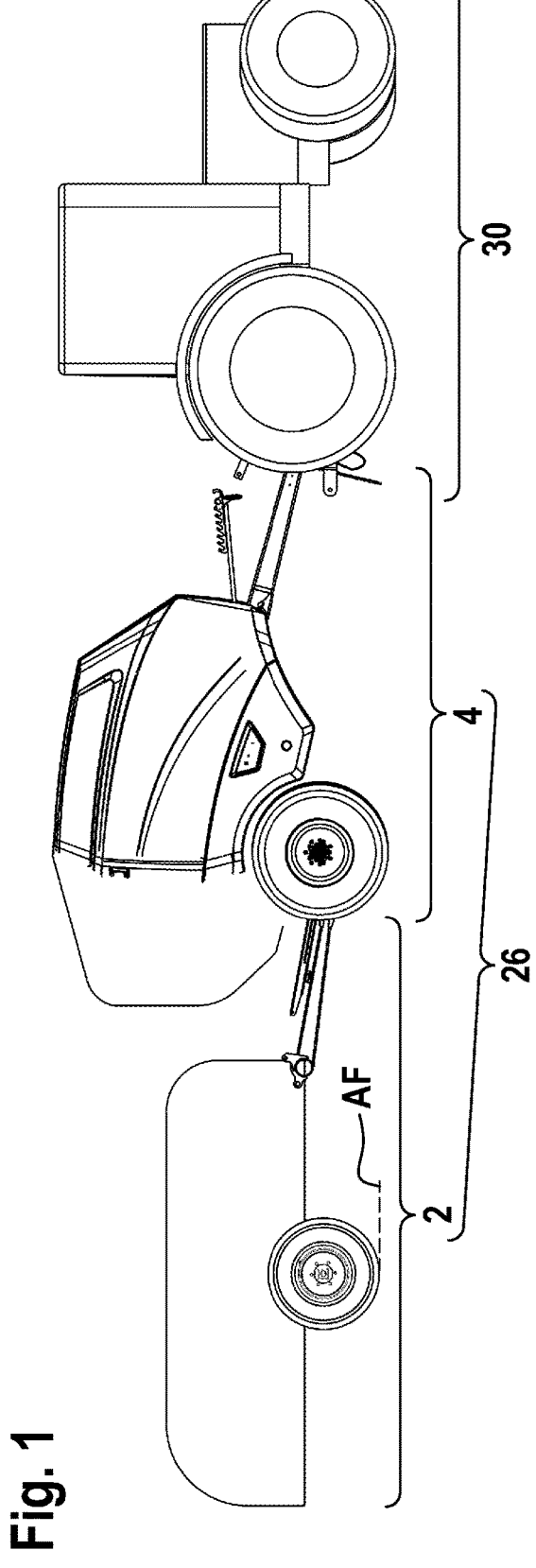
FIG. 1 shows a side view of a vehicle combination according to the invention driving straight ahead.
Figure 2:
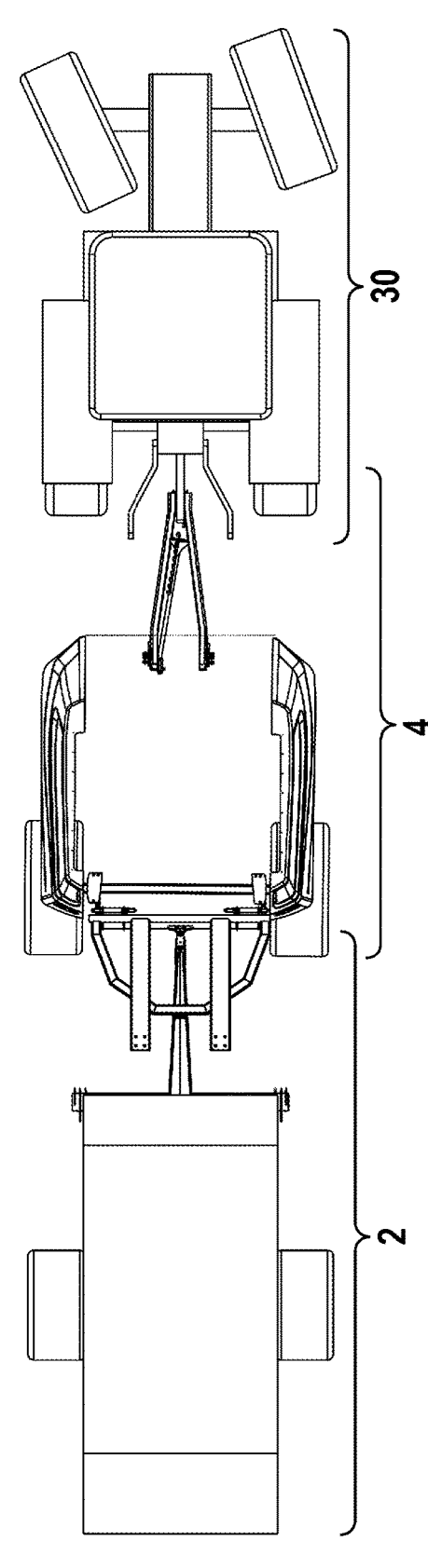
FIG. 2 shows the vehicle combination according to FIG. 1 in a top view.
Figure 6:
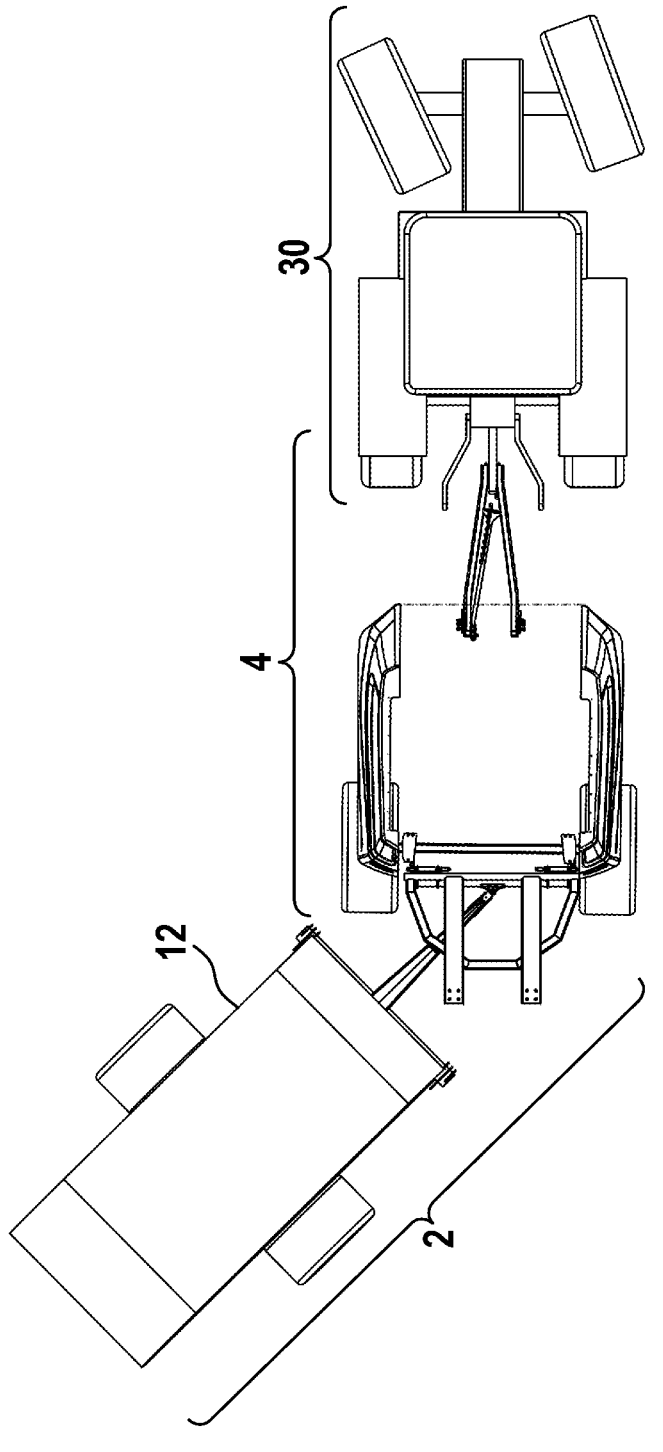
FIG. 6 shows the vehicle combination according to FIG. 1 during a change of direction in a top view.

FIG. 1, FIG. 2, and FIG. 6 show a vehicle combination 26 according to the invention comprising a round baler 4 towed by a tractor unit 30 and a bale pickup device 2 coupled to the round baler 4. The bale pickup device 2 serves to pickup a plurality of round bales, not shown, from the round baler 4, in order to be able to deposit the round bales collectively and not need to subsequently pickup each round bale individually.

Figure 3:
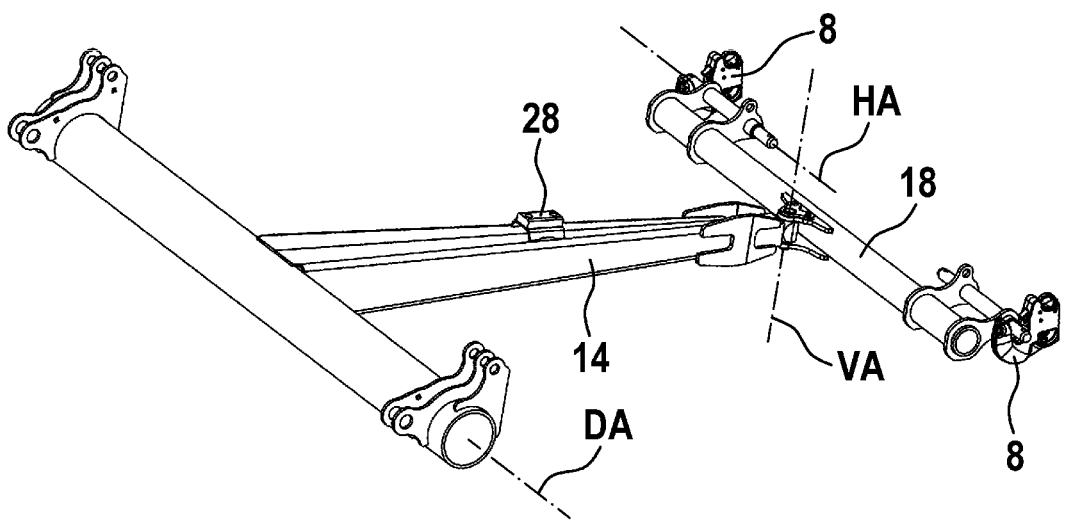
FIG. 3 shows a coupling device and a drawbar element of a bale pickup device according to the invention of the vehicle combination according to FIG. 1 in a perspective representation.

The bale pickup device 2 comprises a coupling device 6. The coupling device 6 comprises two coupling frame elements 8, which are fixedly arranged on a vehicle axle 32 of a machine frame 10 of the round baler 4 (cf. FIG. 3 and FIG. 4). The coupling device 6 moreover comprises an intermediate coupling element 18. The intermediate coupling element 18 is mounted pivotably movable about a transverse axis HA on the coupling frame elements 8. A drawbar element 14 is mounted pivotably movable about a vertical axis VA on the intermediate coupling element 18. A longitudinal axis LA is, in particular, arranged at a right angle to both the vertical axis VA and the transverse axis HA, at least in one position. The drawbar element 14 extends in a pickup direction AR between the intermediate coupling element 18 and a machine frame 12 of the pickup device 2. The vertical axis VA extends at least in a first position of the coupling device 6 at a right angle to a contact surface AF of the bale pickup device 2 (cf. FIG. 1). A transfer element 16 is pivotably mounted on the intermediate coupling element 18 about the transverse axis HA. The transfer element 16 is immovable relative to the coupling device 6 about the vertical axis VA or an axis parallel thereto (cf. FIG. 4 and FIG. 7). The transfer element 16 extends in the pickup direction AR in such a way that the drawbar element 14 in the longitudinal section or alternatively the side view according to FIG. 5 is arranged at least in part between the transfer element 16 and the contact surface AF.

Figure 5:
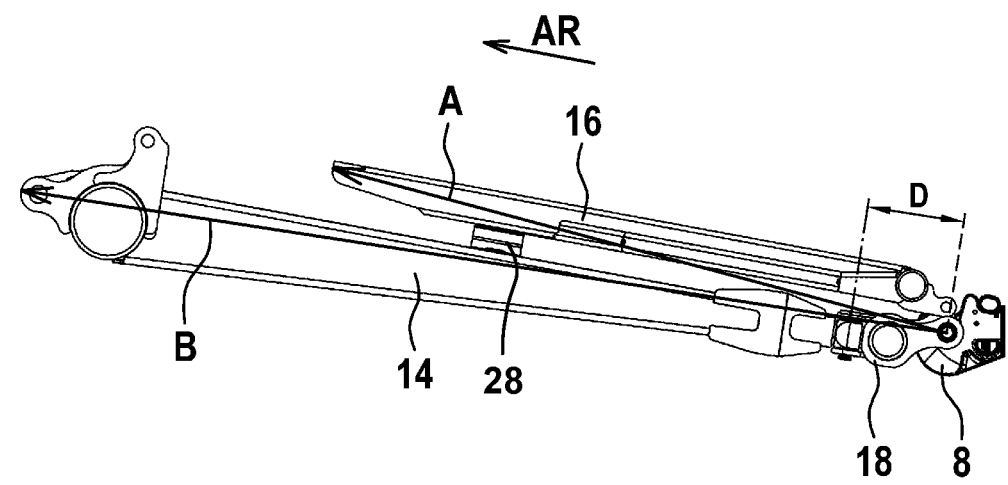
FIG. 5 shows the parts according to FIG. 4 in a longitudinal section.

The transfer element 16 has a radial extension A relative to the transverse axis HA, which corresponds to at least two-thirds of a clearance B of the machine frame 12 of the bale pickup device 2 from the transverse axis HA (cf. FIG. 5). The radial extension is variable in the bale pickup device 2 according to FIG. 8 by means of screwed extension elements 34 of the transfer element 16. A clearance C of the vertical axis VA from the machine frame 12 of the bale pickup device 2 (cf. FIG. 8) is, moreover, at least five times as large as a clearance D of the vertical axis VA from the transverse axis (cf. FIG. 5). The bale pickup device 2 comprises two drawbar adjustment elements 20 which are configured for a pivoting of the drawbar element 14 relative to the machine frame 12 of the bale pickup device 2, about a drawbar pivot axis DA, which runs parallel to the transverse axis HA in the straight-ahead position of the bale pickup device 2 shown in FIG. 1 and FIG. 2 (cf. FIG. 8).

Figure 4A:
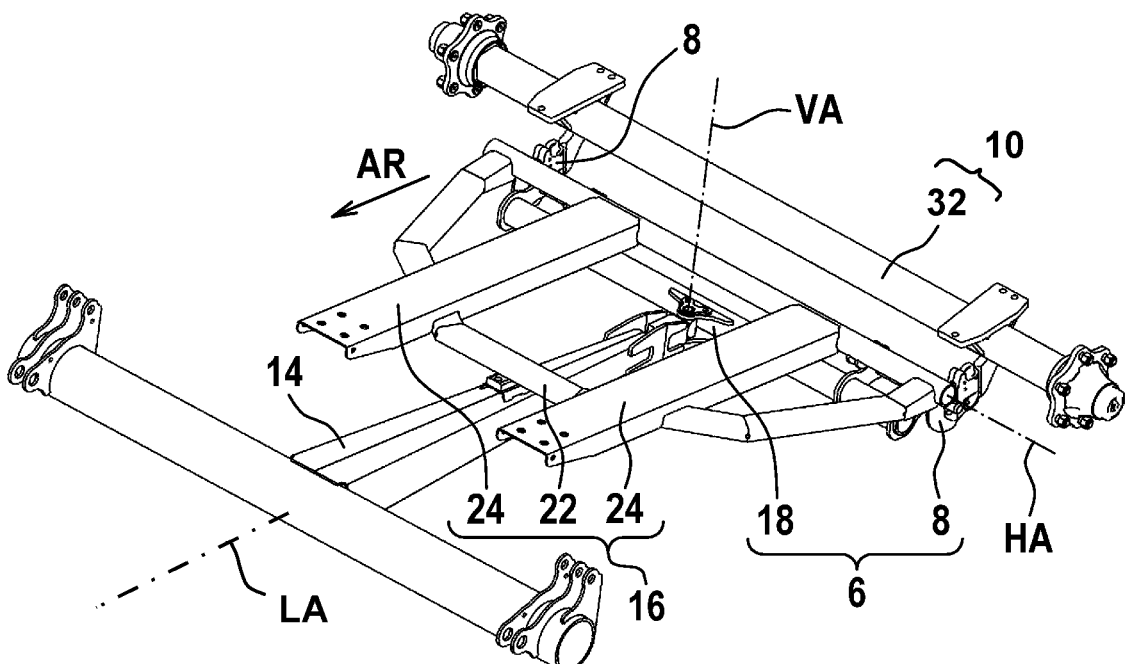
FIG. 4*a* shows the parts and additional elements of the vehicle combination according to FIG. 3 in a perspective representation.
Figure 7:
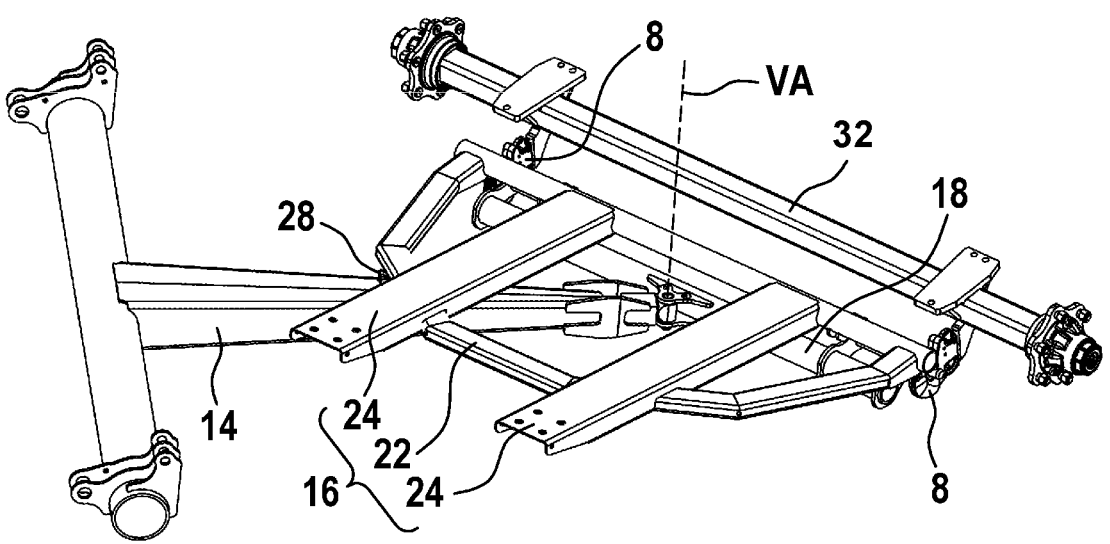
FIG. 7 shows a perspective view of the parts according to FIGS. 4*a* and 4*b* during a change of direction.
Figure 8:
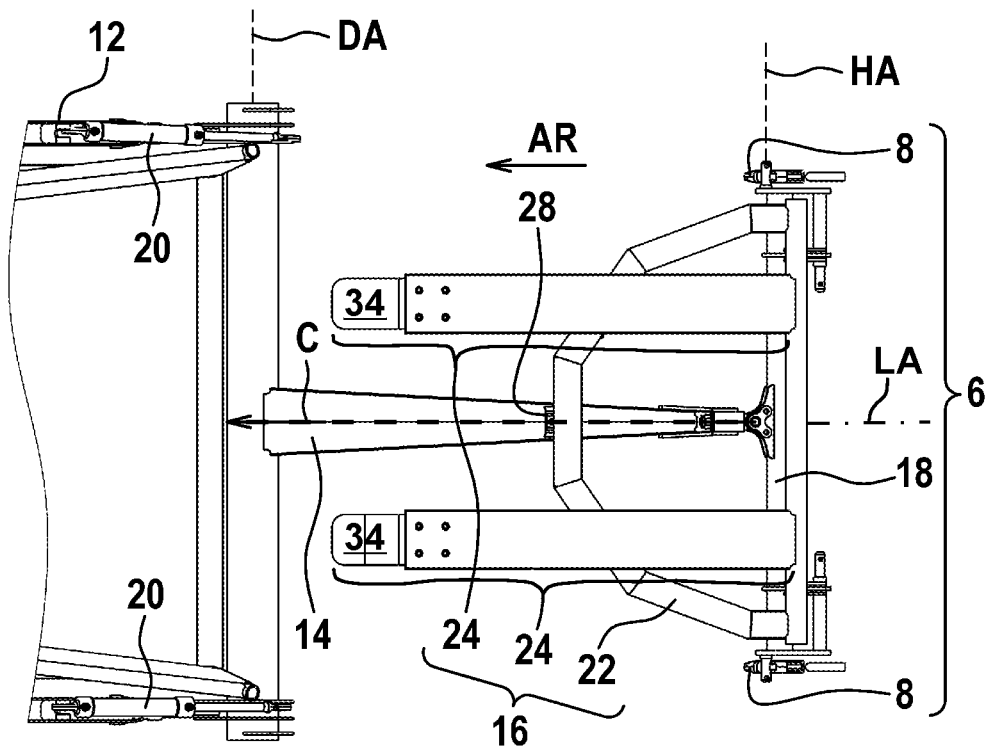
FIG. 8 shows a coupling device, a drawbar element, a transfer element, and a portion of a machine frame of a further bale pickup device according to the invention in a plan view. An artisan of ordinary skill in the art need not view, within isolated figure(s), the near infinite number of distinct permutations of features described in the following detailed description to facilitate an understanding of the present invention.

The transfer element 16 comprises a support segment 22 extending in a circular shape about the vertical axis VA, which is shown in simplified form in FIG. 4*a*, FIG. 7, and FIG. 8 as consisting of straight elements angled towards one another. The support segment 22 serves to support the transfer element 16 on the drawbar element 14. Between them, a ball bearing or a slide bearing 28 made of plastic is arranged on the drawbar element 14, which allows the pivoting of the drawbar element 14 relative to the transfer element 16 about the vertical axis VA (cf. FIG. 7). In addition to the support segment 22, the transfer element 16 comprises two transfer segments 24 extending longitudinally in the pickup direction AR, between which the drawbar element 14 is arranged in the plan view according to FIG. 8.

Figure 4B:
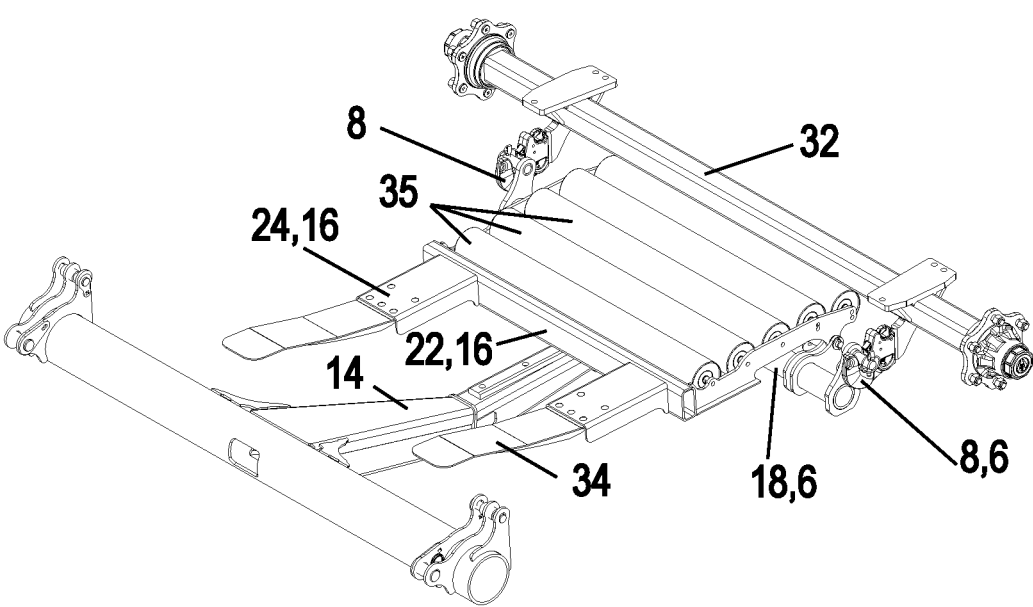
FIG. 4*b* shows a further embodiment of the coupling device and the drawbar element.

In the transfer element 16 of the embodiment shown in FIG. 4*b*, the support segment 22 is in contrast approximately U-shaped and, moreover, carries rollers 35. This allows the round bale ejected from the round baler 4 to roll quickly and reliably to the bale pickup device 2 with less friction on the initially very steep transfer element 16.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

| List of Reference Characters | |
|---|---|
| 2 | Bale pickup device |
| 4 | Round baler |
| 6 | Coupling device |
| 8 | Coupling frame elements |
| 10 | Machine frame |

TABLE 1-continued

List of Reference Characters

| | |
|---|---|
| 12 | Machine frame of the pickup device |
| 14 | Drawbar element |
| 16 | Transfer Element |
| 18 | Intermediate coupling element |
| 20 | Drawbar adjustment element(s) |
| 22 | Support segment |
| 24 | Transfer segments |
| 26 | Vehicle combination |
| 28 | Ball bearing or slide bearing |
| 30 | Tractor unit |
| 32 | Vehicle axle |
| 34 | Secure elements of the transfer element |
| 35 | Rollers |
| A | Radial extension |
| AF | Contact surface |
| AR | Pickup direction |
| B | Clearance |
| C | Clearance of the vertical axis from the machine frame of the bale pickup device |
| D | Clearance of the vertical axis from the transverse axis |
| DA | Drawbar pivot axis |
| HA | Transverse axis |
| LA | Longitudinal axis |
| YA | Vertical axis |

GLOSSARY

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein, refers to slight variations in numerical quantities with respect to any quantifiable variable. Inadvertent error can occur, for example, through the use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes a structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

The invention claimed is:

1. A bale pickup device (2) for picking up of at least one round bale from a round baler (4), comprising:
   a coupling device (6) with at least one coupling frame element (8) to be fixedly arranged on a machine frame (10) of the round baler (4);
   at least one drawbar element (14) extending in a pickup direction (AR) at least partially between the coupling frame element (8) and a machine frame (12) of the bale pickup device (2) and mounted in such a way on the coupling device (6) that the drawbar element (14) is pivotably movable relative to the coupling frame element (8) at least about a vertical axis (VA) perpendicular to a contact surface (AF) of the bale pickup device (2) at least in a first position of the coupling device (6);
   a transfer element (16) mounted to the coupling device (6) and extending therefrom in a pickup direction (AR), the transfer element pivotably movable relative to the drawbar element (14) at least about the vertical axis (VA) and wherein the drawbar element (14) is arranged at least partially between the transfer element (16) and the contact surface (AF) in a side view; and
   wherein the transfer element (16) is mounted on the coupling device (6) in such a way that said transfer element (16) is pivotably movable relative to the coupling frame element (8) about a transverse axis (HA) parallel to the contact surface (AF).

2. The bale pickup device according to claim 1, wherein the drawbar element (14) is mounted on the coupling device (6) in such a way that said drawbar element (14) is pivotably movable relative to the coupling frame element (8) about the transverse axis (HA).

3. The bale pickup device according to claim 1, wherein the transfer element (16) is mounted on the coupling device (6) in such a way that said transfer element (16) is pivotably movable relative to the drawbar element (14) about the transverse axis (HA).

4. The bale pickup device according to claim 1, wherein the coupling device (6) comprises an intermediate coupling element (18) that is mounted on the coupling frame element (8) so as to be exclusively pivotably movable about the transverse axis (HA) and is mounted on the drawbar element (14) so as to be exclusively pivotably movable about the vertical axis (VA), and wherein the intermediate coupling element (18) extends transverse the drawbar element in the pickup direction (AR).

5. The bale pickup device according to claim 1, wherein the transfer element (16) is mounted on the intermediate coupling element (18) spaced apart from the coupling frame element (8).

6. The bale pickup device according to claim 1, wherein the transfer element (16) comprises a radial extension (A) relative to the transverse axis (HA), which extension, at least in a straight-ahead position of the bale pickup device, corresponds to at least half, at least two thirds, or at least three quarters, of a clearance (B) of the machine frame (12) of the bale pickup device (2) from the transverse axis (HA).

7. The bale pickup device according to claim 1, further comprising a clearance (C) of the vertical axis (VA) to the machine frame (12) from the bale pickup device (2) is at least as large, at least twice as large, or at least five times as large, as a clearance (D) of the vertical axis (VA) from the transverse axis (HA).

8. The bale pickup device according to claim 1, further comprising at least one drawbar adjustment element (20) configured for a pivoting of the drawbar element (14) relative to the machine frame (12) of the bale pickup device (2) about a drawbar pivot axis (DA) arranged parallel to the transverse axis (HA) in a straight-ahead position of the bale pickup device (2).

9. The bale pickup device according to claim 1, wherein the transfer element (16) includes a support segment (22) for supporting the transfer element (16) on the drawbar element (14).

10. The bale pickup device according to claim 9, wherein the support segment (22) extends in a circular arc shape about the vertical axis (VA).

11. The bale pickup device according to claim 1, wherein a ball bearing or a slide bearing (28), is arranged between the drawbar element (14) and the transfer element (16).

12. The bale pickup device according to claim 1, wherein the transfer element (16) comprises at least two transfer segments (24) extending longitudinally in the pickup direction (AR), between which the drawbar element (14) extends at least partially, in a plan view, at least when in a straight-ahead position of the bale pickup device (2).

13. A vehicle combination (26) comprising:

a round baler (4); and a bale pickup device (2) according to claim 1 that is coupled to the round baler (4), wherein the at least one coupling frame element (8) is fixedly arranged on a machine frame (10) of the round baler (4).

14. The vehicle combination according to claim 13, wherein the at least one coupling frame element (8) is arranged on an undercarriage vehicle axle (32) encompassed by the machine frame (10) of the round baler (4).

\* \* \* \* \*